United States Patent [19]
Martinelli et al.

[11] Patent Number: 5,268,739
[45] Date of Patent: Dec. 7, 1993

[54] LASER APPARATUS FOR MEASURING THE VELOCITY OF A FLUID

[75] Inventors: Mario Martinelli, San Donato Milanese; Valeria Gusmeroli, Milan, both of Italy

[73] Assignee: Cise S.p.A., Milan, Italy

[21] Appl. No.: 803,485

[22] Filed: Dec. 4, 1991

[30] Foreign Application Priority Data

Dec. 4, 1990 [IT] Italy ................... 22278 A/90

[51] Int. Cl.$^5$ ............................ G01P 3/36; G01B 9/02
[52] U.S. Cl. .................. 356/349; 250/227.27; 356/28.5
[58] Field of Search ............ 356/349, 358, 336, 338, 356/28.5; 250/227.19, 227.27; 385/7, 14, 11

[56] References Cited

U.S. PATENT DOCUMENTS

| | | | |
|---|---|---|---|
| 4,569,588 | 2/1986 | Nishiwaki et al. | 356/28.5 |
| 4,627,731 | 12/1986 | Waters et al. | 356/349 |
| 4,818,071 | 4/1989 | Dyott | 356/349 X |
| 4,892,406 | 1/1990 | Waters | 356/349 |
| 5,012,118 | 4/1991 | Preikschat et al. | 356/336 X |

FOREIGN PATENT DOCUMENTS

| | | |
|---|---|---|
| 0295546 | 12/1988 | European Pat. Off. . |
| 0355300 | 2/1990 | European Pat. Off. . |
| 0374027 | 6/1990 | European Pat. Off. . |
| 2-140640 | 5/1990 | Japan ..................... 356/73.1 |
| 8302329 | 7/1983 | PCT Int'l Appl. . |
| 8807179 | 9/1988 | PCT Int'l Appl. . |

OTHER PUBLICATIONS

Patent Abstracts of Japan; vol. 9, No. 54(P-340)(1777), Mar. 1985 and JP-A-59 192 967 (Mitsubishi Jukogyo K.K.) 1 (1984).

*Primary Examiner*—Vincent P. McGraw
*Attorney, Agent, or Firm*—Hedman, Gibson & Costigan

[57] ABSTRACT

In a laser apparatus for measuring the velocity of a fluid, a measurement laser light beam (M) fed into the fluid and scattered by a particle within the fluid is made to interfere with a reference laser light beam (R) to generate an interference signal based on the velocity of the particle; the apparatus comprises a low-coherence laser source (10) and interferometric means (11, 12) which split the light beam of the laser source (10) into the stated reference light beam (R) and measurement light beam (M), and cause the reference light beam (R) derived from the laser source (10) to interfere with the backscattered component resulting from the scattering of the measurement light beam (M).

22 Claims, 5 Drawing Sheets

LASER APPARATUS FOR MEASURING THE VELOCITY OF A FLUID

This invention relates to a laser apparatus for measuring the velocity of a fluid.

Laser apparatus for measuring the velocity of a fluid in a pipe are known, based on measuring the frequency variation undergone by a laser beam when scattered by a particle within the fluid. The particle can be naturally present in the fluid or can be introduced artificially in order to effect the velocity measurement.

The frequency variation is measured by an interferometric method, by which the laser beam which has undergone the frequency variation is made to interfere with another laser beam which has not undergone or has differently undergone the frequency variation.

The commonly used apparatus comprises a laser source which feeds the light beam to suitable optical elements which split it into two separate light beams; the two light beams, of which one is for reference and one for measurement, are concentrated by a lens onto an internal point of the pipe through which the fluid flows, by passing through a transparent window provided in the pipe wall; the light scattered along a determined axis by the particle passing through said internal point is collected external to the pipe by other optical elements, after passing either through said window or through another transparent window provided in the pipe wall, depending on the collection position. These other optical elements concentrate this scattered light into a photodetector or onto a photomultiplier.

The light scattering along said axis by the particles is the result of superimposing the light beam scattered by the effect of the reference light beam incident on the particle, onto the light beam scattered by the effect of the measurement light beam incident on the particle.

Said axis can lie between the axes of the two incident light beams or can coincide with the axis of the incident reference light beam.

Superimposing the two scattered light beams produces an interference light signal which is converted by the photodetector of photomultiplier into an electrical signal based on the velocity of the particle and hence of the fluid at that point of the pipe onto which the two incident light beams are concentrated. The two incident light beams enable the position within the pipe of the internal point onto which they are concentrated to be exactly determined.

A processor unit connected to the output of the photodetector or photomultiplier provides data regarding the fluid velocity at that point.

Measuring the fluid velocity within a pipe by such apparatus however has two considerable drawbacks.

In this respect, such measurement requires the availability of one or more windows provided in the pipe wall and having an appropriate size and shape to enable the light beams to pass form the outside to the inside of the pipe and vice versa but to limit aberration effects. This however results in a measurement system which is too demanding in that it requires considerable modifications to the pipe, which disturb its normal configuration. In addition, optical components of a certain size have to be positioned in proximity to the pipe. The apparatus cannot therefore be used if the pipe is not easily accessible.

The object of the present invention is to provide a laser apparatus for measuring the velocity of a fluid within a pipe which obviates the drawbacks of the aforesaid apparatus. This object is attained by a laser apparatus for measuring the velocity of a fluid, in which a measurement laser light beam fed into the fluid and scattered by a particle within the fluid is made to interfere with a reference laser light beam to generate an interference signal based on the velocity of the particle, characterised by comprising a low-coherence laser source and interferometric means which split the light beam of said laser source into said reference light beam and said measurement light beam, and cause the reference light beam derived from the laser source to interfere with the backscattered component resulting from the scattering of the measurement light beam.

The characteristics and advantages of the present invention will be apparent from the description of some embodiments thereof given hereinafter by way of non-limiting example with reference to the accompanying drawings, in which.

Figure 1:
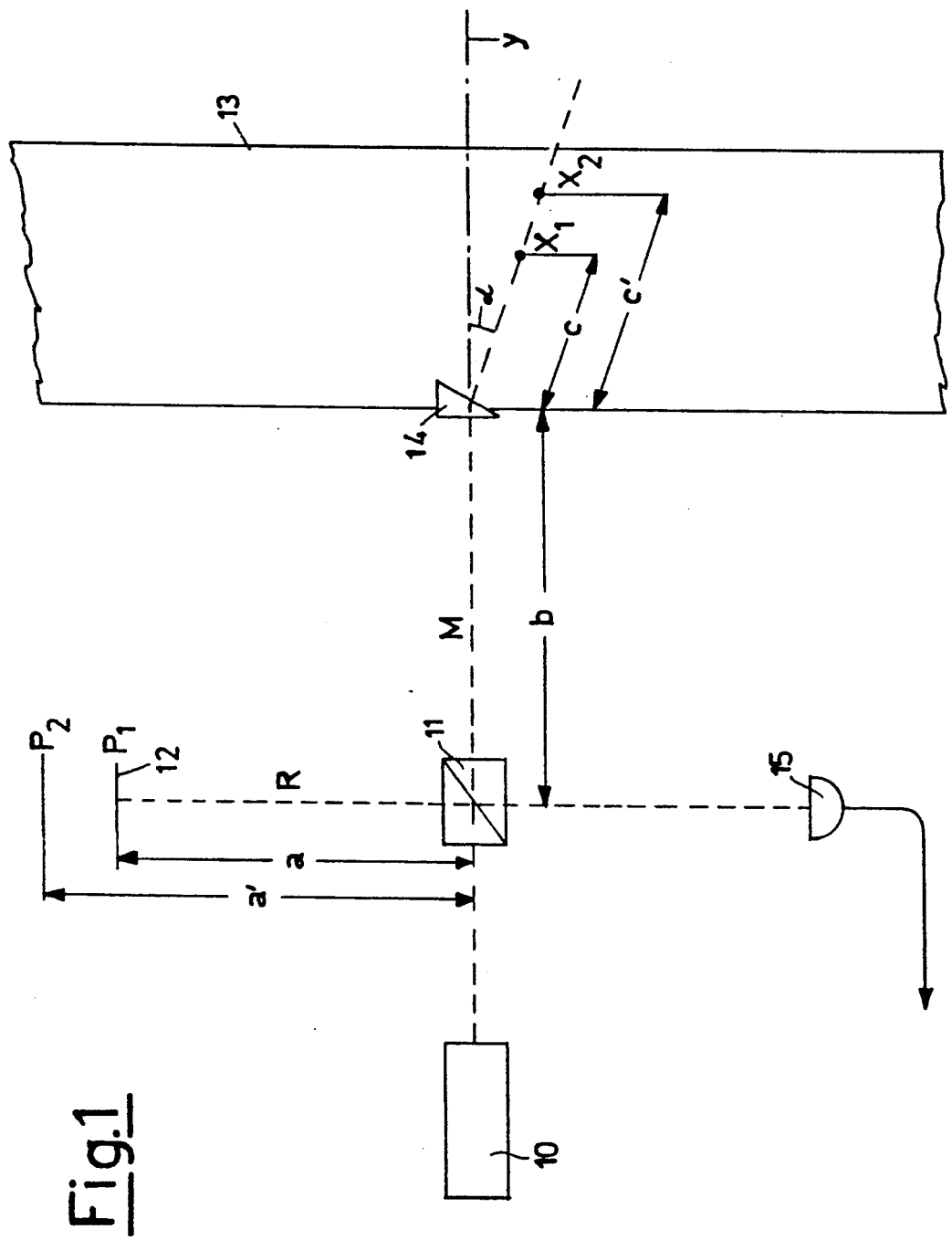
FIG. 1 shows the basic scheme of an apparatus according to the invention.

The scheme of FIG. 1 shows a low-coherence laser source 10 which feeds a light beam to splitter 11. The fed beam is split by the beam splitter 11 into a reflected light beam constituting a reference light beam R, and a transmitted light beam constituting a measurement light beam M. The reference light beam R encounters a mirror 12 and reverses in the direction of the beam splitter 11. The measurement light beam M is fed by way of example into a pipe 13 through which there flows a fluid, the velocity of which is to be measured. The measurement light beam M, directed perpendicular to the flow direction of the fluid in the pipe 13, penetrates into the pipe through a window provided in the pipe wall and consisting of a deflection prism 14 which deviates the light beam through an angle alpha. The measurement light beam M which has penetrated into the pipe 13 is scattered by the particles within the fluid which it encounters in its path.

Specifically, the backscattered component resulting from the scattering of the measurement light beam incident on the particles, i.e. the component which has scattered rearwards along the same path as the incident measurement light beam, passes through the prism 14 to encounter the light beam reflected by the mirror 12 in the beam splitter 11. This backscattered component is known hereinafter as the backscattered measurement light beam. The two said light beams, i.e. the beam backscattered by the particles and the beam reflected by the mirror 12 are caused by the beam splitter 11 to interfere on a photodetector 15. With reference to the measurement light beam backscattered by a particle at the point in the pipe 13 indicated by $x_1$, because of the low-coherence characteristics of the laser source 10 interference occurs between the reference light beam reflected by the mirror 12 and the measurement light beam backscattered by the particle located at point $x_1$ only if the difference between the two optical arms of the described interferometer, i.e. the arm relative to the portion a and the arm relative to the portions b and c added together, is less than or equal to the coherence length of the laser source. If the difference between the optical arms is greater than the coherence length, there is no interference. As this coherence length is very small, of the order of tens of microns, it is apparent that when the optical arms of the interferometer respect said condition there is basically present at the point $x_1$ only the measurement light beam backscattered by the particle, to produce interference on the photodetector 15 with the reference light beam reflected by the mirror 12 in the position $P_1$. The measurement light beam backscattered by the other particles lying along the path of the incident measurement light beam do not produce any interference as said condition is not respected.

Said condition is inter alia a condition of balance between the optical arms of the interferometer.

In this situation the measurement light beam backscattered by the particle at the point $x_1$ is shifted in frequency with respect to the light beam emitted by the laser source 10, and hence with respect to the reference light beam reflected by the mirror 12, by an amount directly proportional to the velocity of the particle and to the sine of the angle alpha, and inversely proportional to the average wavelength of the light beam emitted by the laser source 10. This frequency shift is detected by the interference produced on the photodetector 15, which emits an electrical signal corresponding to the optical interference signal, and hence a function of the velocity of the particle at the point $x_1$. By suitably processing this electrical signal using known methods, the value of the velocity of the particle at the point $x_1$ can be obtained.

The prism 14 provides the correct deviation of the light beam within the pipe 13 to the line Y perpendicular to the pipe fluid flow direction required to produce the frequency shift of the backscattered measurement light beam.

It should be noted that for optical communication between the outside and inside of the pipe 13, only one window (prism 14) is used, this being of small size as the incident measurement light beam and the backscattered light beam travel along the same optical path.

As will be noted hereinafter, an apparatus based on this scheme does not require large-dimension optical components in proximity to the pipe, both because the reference light beam is obtained directly from the light beam emitted by the laser source and because the incident measurement light beam and the backscattered light beam travel along the same optical path.

The initially stated drawbacks of known apparatus are therefore remedied.

If the velocity of a particle at the piont $x_2$ of the pipe 13 lying along the incident measurement light beam is to be measured, it is only necessary, from the aforegoing, to move the mirror 12 from its position $P_1$ to a position $P_2$ in which the difference between the two optical arms of the interferometer, i.e. the arm relative to the portion a' and the arm relative to the portions b and c' added together, is less than or equal to the coherence length of the laser source.

From the aforegoing it is therefore possible to analyze the velocity of all the particles lying along the incident measurement light beam, and hence generally by suitably orientating the incident measurement light beam the velocity of the particles within the fluid, so that the velocity of the fluid can be analyzed along a chord or along a diameter of the pipe cross-section.

This is extremely advantageous, as in practical applications the knowledge of the fluid velocity at one point of the pipe is often not sufficient to provide significant information on the fluid motion. Much more significant information for hydrodynamic purposes is that provided by measuring the distribution of the fluid velocity along a chord or along a diameter of the pipe cross-section.

The known apparatus mentioned in the introduction involve a series of difficulties if investigating different points within the pipe. Firstly, it may be necessary to provide even larger windows of special shape to allow light beams to pass at variable inclinations as the point under measurement varies, and to limit the consequent aberration effects, with the result that the measurement system becomes even more demanding.

The scanning of different points within the pipe requires the handling of a certain number of very large components comprising the apparatus, and this can prejudice their operation.

Finally, the optical elements for projecting and collecting the light beams are optimized for a certain measurement "depth" within the pipe. Any significiant variation in this "depth" varies the characteristics of the apparatus, to compromise measurement accuracy.

These difficulties do not exist with the apparatus scheme of FIG. 1.

In this respect, as already stated, only a single small-dimension window is required.

In addition the scanning of the various points within the pipe is effected by simply moving a single optical component, i.e. the mirror 12.

Finally, the apparatus behaves equally in scanning every point within the pipe along the chord or diameter of the pipe cross-section, because the optical characteristics of the entire system remain constant as the mirror moves. This is because during this scanning, neither the path nor the inclination of the light beam changes within the pipe. The measurement accuracy therefore remains constant as the point of measurement varies.

It should be added that the apparatus operating on the aforesaid principle to measure the fluid velocity at a point within the pipe does not require this measurement point to be geometrically defined by two light beams as in the known apparatus described in the introduction, but requires only the use of a single light beam as it is the condition of balance between the two optical arms of the interferometer which enables the point under measurement to-be defined. In this respect the optical arm relative to the measurement light beam which defines the point under measurement is equal to the optical arm, of known value, relative to the reference light beam less the coherence length of the laser source. The measurement point is therefore definable with an accuracy which depends on the coherence length of the laser source, and is determined better than in the case of known apparatus.

Figure 2:
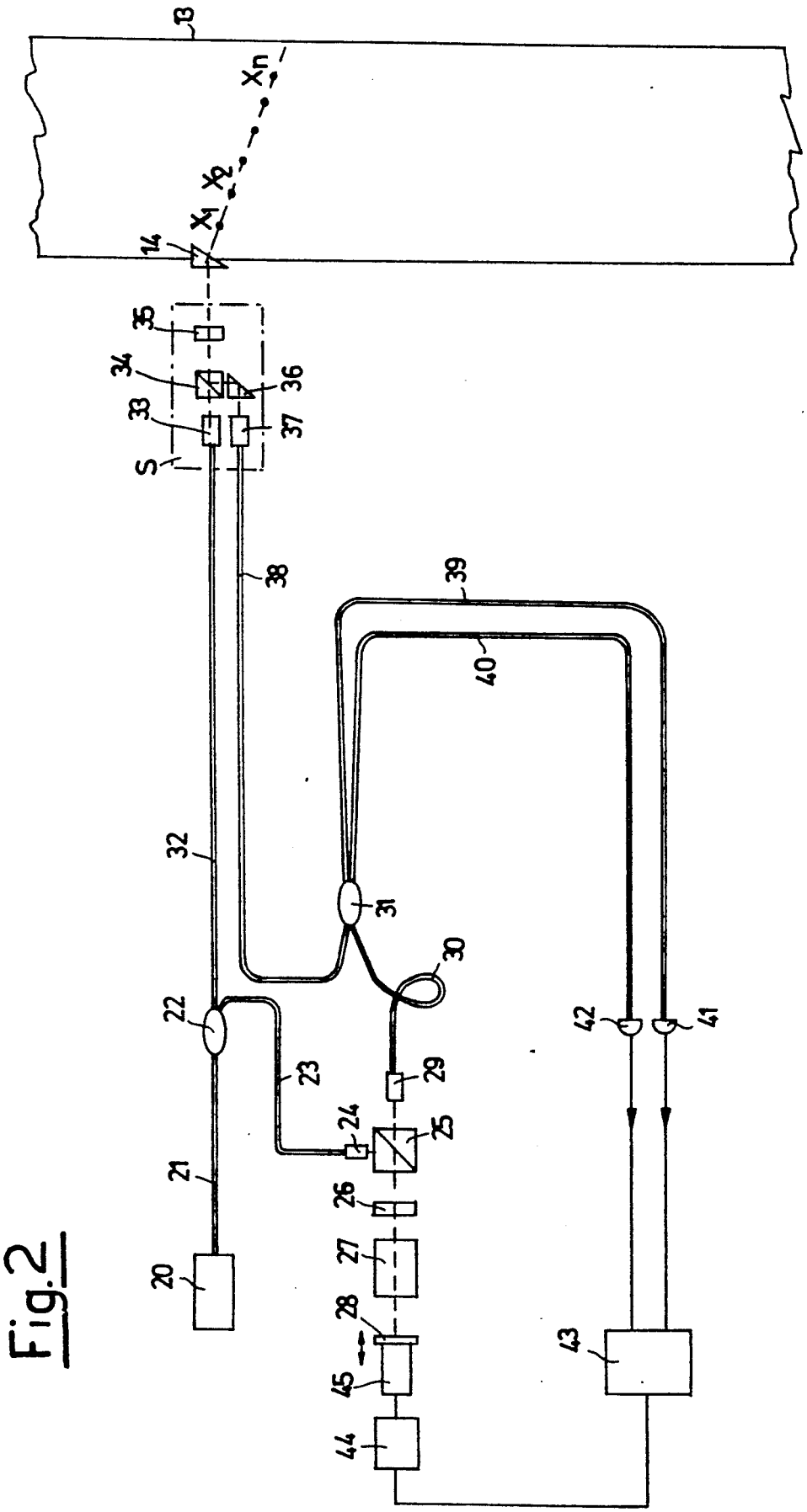
FIG. 2 is a schematic illustration of a first apparatus of the invention.

FIG. 2 shows a first embodiment of an apparatus operating in accordance with the aforesaid principles.

The apparatus comprises a superluminescent laser source 20, which as is well known has low coherence characteristics. The light beam emitted by the source 20 is fed through an optical fibre 21 to a directional coupler 22 which splits it into a reference light beam and a measurement light beam.

The reference light beam is fed through an optical fibre 23 to an optical collimation element 24 which directs the light beam onto a polarizing beam splitter 25.

The light beam is then deviated by reflection by the beam splitter 25 onto a quarter-wave delay plate 26, passes through a modulator 27 and encounters a movable mirror 28 which reflects it. The light beam reflected by the mirror 28 again passes through the modulator 27 and the delay plate 26, then passes through the beam splitter 25 to be collected by an optical collection element 29. The light beam collected by the element 29 is fed through an optical fibre 30 to a directional coupler 31. The measurement light beam is fed through an optical fibre 32 to an optical collimation element 33 which directs the light beam onto a polarization beam splitter 34. The light beam passes through the beam splitter 34, and then through a quarter-wave delay plate 35, to encounter the deflection prism 14. As seen in the scheme of FIG. 1, the light beam passes through the prism 14, penetrates into the pipe 13 at a suitable angle and is scattered by the particles within the fluid which it encounters during its path, for example at the points $x_1, x_2 \ldots x_n$ of the pipe 13. The measurement light beam backscattered along the path of the incident light beam passes through the prism 14 and the delay plate 35, and is reflected by the beam splitter 34 onto a deflection prism 36 which deviates the light beam onto an optical collection element 37. The backscattered measurement light beam collected by the element 37 is fed through an optical fibre 38 to the directional coupler 31.

In the directional coupler 31 the reference light beam reflected by the mirror 28 is superimposed on the measurement light beam backscattered by the particles within the fluid at the points $x_1, x_2 \ldots x_n$. From two separate exits of the directional coupler 31 there are emitted two separate light signals, which are identical but 180° out of phase, each being the result of said superimposing of the reflected reference light beam on the backscattered measurement light beam. The two said light signals are fed via respective optical fibres 39 and 40 to two respective photodetectors 41 and 42. On each photodetector an optical interference signal is produced due to the superimposing of the reflected reference light beam on the backscattered measurement light beam. At the output of the two photodetectors 41 and 42 two identical electrical signals 180° out of phase are obtained corresponding to the two said interference signals.

The outputs of the two photodetectors 41 and 42 are connected to an electronic processor unit 43. The unit 43 is also connected to a stepping motor 44 which moves a translator 45 to which the mirror 28 is fixed. The mirror 28 is moved parallel to itself by the translator 45, driven by the stepping motor 44.

As in the scheme of FIG. 1 and for the same reasons, in the apparatus of FIG. 2 for each position of the mirror 28 there corresponds an interference signal based on the velocity of a particle passing through a specific point of the points $x_1, x_2 \ldots x_n$. Hence by moving the mirror 28 by means of the motor 44 it is possible to measure the fluid velocity distribution at these points.

In contrast to the scheme of FIG. 1, dividing the light beam of the laser source into a reference light beam and a measurement light beam and combining the reference light beam reflected by the mirror with the measurement light beam backscattered by the particles is not done in the same optical element (which in the case of FIG. 1 is the beam splitter 11) but is done in two different optical elements, i.e. in the two directional couplers 22 and 31.

The use of optical fibres dispenses with the need for the obligatory alignments of the scheme of FIG. 1.

It should be noted that in the apparatus of FIG. 2 the most bulky and voluminous part of the apparatus, i.e. the part for generating and dividing the laser beam and for forming, detecting and processing the interference, is totally separate from the part of minimum dimensions, indicated by S, which performs the function of an actual probe projecting and collecting the light beam, and comprising the optical collimation element 33, the beam splitter 34, the delay plate 35, the deflection prism 36 and the optical collection element 37. These two parts of the apparatus are in fact connected together by only two optical fibres 32 and 38, the length of which can be varied according to requirements, while respecting the necessary dimensions to provide the said balancing of the optical arms. This represents a great advantage in those cases in which there is difficulty in placing the entire apparatus close to the pipe 13, as the probe S can be positioned close to the pipe 13, with the rest of the apparatus positioned at the necessary distance.

Splitting the interference signal into two identical signals out of phase by 180° allows differential measurement in which the difference is computed between the two signals, the resultant interference signal being advantageously double their intensity and free from noise.

Operationally, the electronic processor unit 43 in driving the motor 44 moves the mirror 28 into the various measurement positions and computes the difference to provide the resultant interference signals. From the positions of the mirror 28 and the values of the interference signals, the unit 43 provides the data relative to the velocity of the fluid within the pipe 13 at the various points $x_1, x_2 \ldots x_n$.

The modulator 27, which can be of electro-optical or acoustic-optical type, introduces a carrier signal to the reference light beam and improves the detection characteristics.

The polarizing beam splitter 25 together with the quarter-wave delay plate 26, and the polarizing beam splitter 34 together with the quarter-wave delay plate 35, enable the polarization of the reference light signal and measurement light signal to be controlled such that interference between the two light signals is possible.

Figure 3:
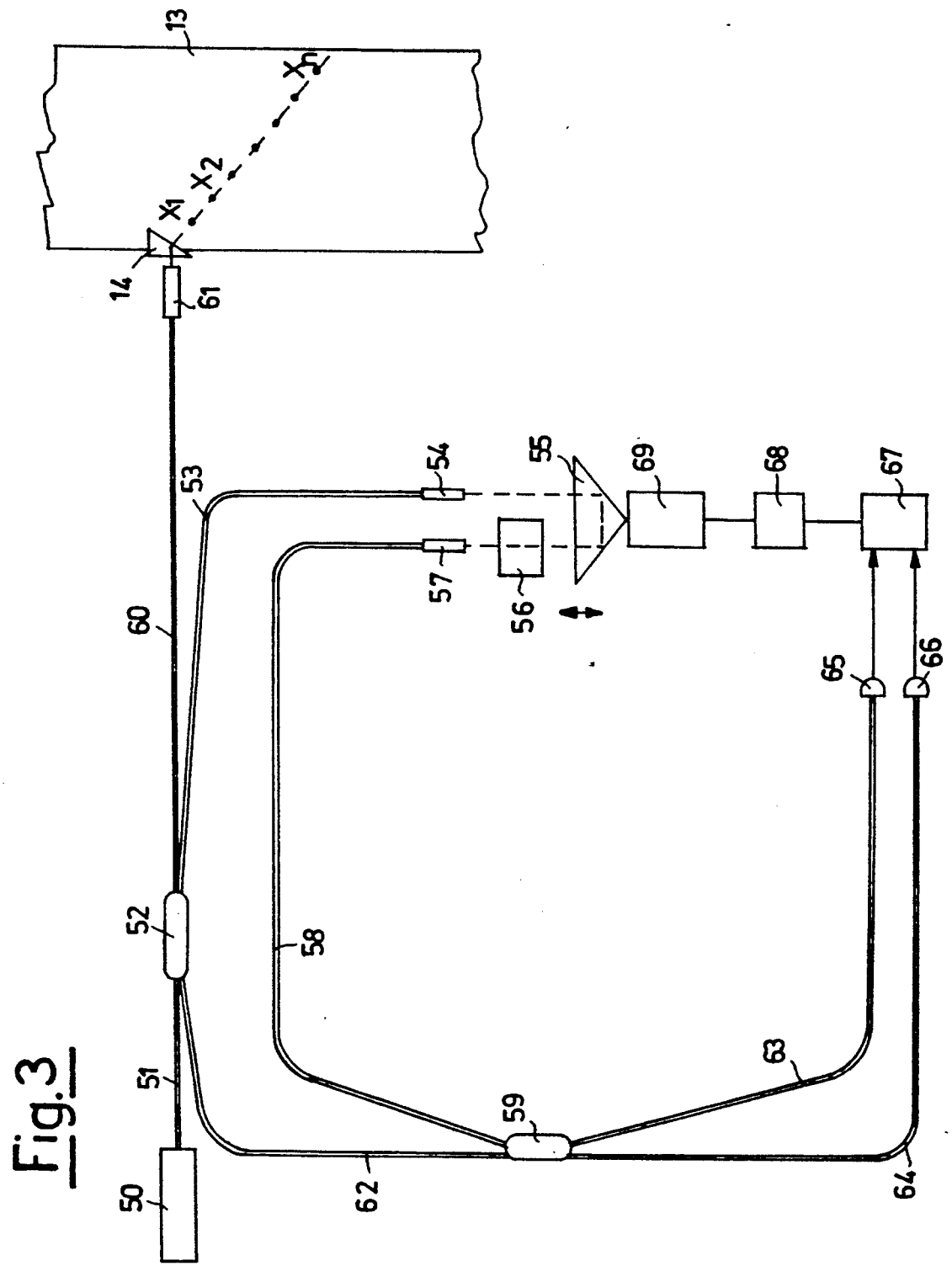
FIG. 3 is a schematic illustration of a second apparatus of the invention.

FIG. 3 shows an alternative apparatus to that of FIG. 2. Again in this case, a superluminescent laser source 50 feeds a light beam through an optical fibre 51 to a directional coupler 52 which splits it into a reference light beam and a measurement light beam.

However in this case the reference light beam is fed through an optical fibre 53 and an optical collimation element 54 to a movable right prism 55. The right prism 55 reflects the light beam onto an optical collection element 57. A modulator 56 is interposed between the prism 55 and the element 57. The light beam collected by the element 57 is fed through an optical fibre 58 to a directional coupler 59.

In addition, in contrast to the apparatus of FIG. 2, the measurement light beam is fed through an optical fibre 60 and an optical element 61 directly to the deflecting prism 14, the backscattered measurement light beam being collected by the same optical element 61 and fed through the same optical fibre 60 to the directional coupler 52 which has split the light beam of the laser source 50. The optical element 61 therefore acts jointly as a collimation element and a collection element, with the incident and backscattered measurement light beam travelling along the same optical fibre 60.

From the directional coupler 52 the backscattered measurement light beam is fed through an optical fibre 62 to the directional coupler 59. In the same manner as the apparatus of FIG. 2, the reference light beam reflected by the right prism 55 is superposed in the coupler 59 on the measurement light beam backscattered by the particles within the fluid at the points $x_1, x_2 \ldots x_n$ of the pipe 13, two separate identical light signals out of phase by 180°, each resulting from said superimposing, being fed through two respective optical fibres 63 and 64 to two respective photodetectors 65 and 66.

The outputs of the two photodetectors 65 and 66 are connected to an electronic processor unit 67. The unit 67 is also connected to a stepping motor 68 which moves a translator 69 to which the right prism 55 is fixed. The right prism 55 is moved parallel to itself by the translator 69, driven by the stepping motor 68. The operation of the apparatus of FIG. 3 is analogous to that of the apparatus of FIG. 2, taking account of the fact that the functions of the movable mirror 28 of FIG. 2 are performed in FIG. 3 by the right prism 55.

The apparatus of FIG. 3 is more simple than the apparatus of FIG. 2, particularly because a single optical fibre 60 is provided, together with a single optical element 61, for projecting and collecting the measurement light beam. Because of the minimum dimensions of the probe of the apparatus of FIG. 3, consisting only of the optical collimation and collection element 61, the most inaccessible pipes can be scanned. As in the case of the apparatus of FIG. 2, the apparatus of FIG. 4 comprises a superluminescent source 70 which feeds a light beam through an optical fibre 71 to a directional coupler 72 which splits it into a reference light beam and a measurement light beam.

The reference light beam is fed through an optical fibre 73 and a modulator 74 to an optical collimation element 75 which produces at its exit a spatially wide optical field.

The measurement light beam is fed through an optical fibre 76 to the same probe S as shown in FIG. 2, which feeds the beam onto the deflection prism 14. The backscattered measurement light beam is fed through an optical fibre 77 to another optical collimation element 78 which produces at its exit a spatially wide optical field.

The wide reference light beam produced by the element 75 is fed via a polarizing beam splitter 79 and a quarter-wave delay plate 80 to a multiple mirror 81. The multiple mirror 81 comprises a series of mirrors 82 arranged in an ordered manner within the optical field at a distance apart corresponding to the separation distance between the investigation points $x_1, x_2 \ldots, x_n$ within the pipe 13.

The wide reference light beam reflected by the multiple mirror 81 is fed through the delay plate 80 and polarizing beam splitter 79 to a beam splitter 83.

The wide measurement light beam produced by the element 78 is also fed to the beam splitter 83.

The two said wide reference and measurement light beams are superimposed within the beam splitter 83, which feeds two separate identical wide light signals out of phase by 180°, each resulting from said superimposing, to two respective series of photodetectors indicated by two blocks 84 and 85. The outputs of the two series of photodetectors 84 and 85 are connected to an electronic processor unit 86.

In this apparatus each mirror 82 allows the formation of an interference light signal relative to the measurement light beam backscattered by a particle within the fluid at a specific point of the points $x_1, x_2 \ldots x_n$. A respective pair of photodetectors, one pertaining to the photodetector series 84 and the other to the photodetector series 85, enables the unit 86 to compute the interference signal difference for the point under measurement and hence the fluid velocity at this point.

Figure 4:
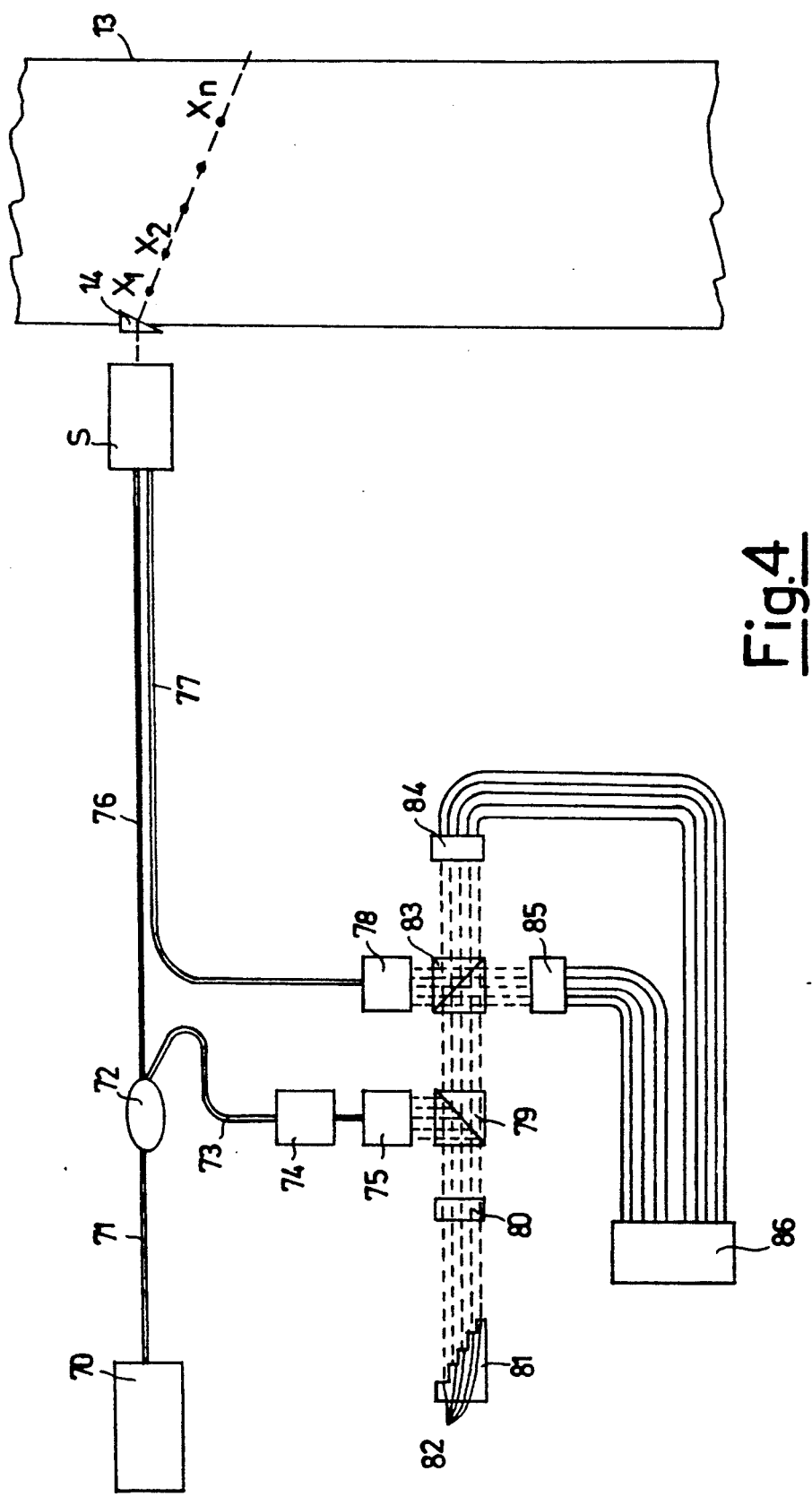
FIG. 4 is a schematic illustration of a third apparatus of the invention.

The apparatus of FIG. 4 therefore measures the fluid velocity at different points within the pipe at the same time without having to move the optical components within the apparatus, in contrast to the previously described apparatus in which the fluid velocity at one point is measured at a different time from that at another point, after moving an optical component (the mirror 28 or the right prism 55).

Basically the apparatus of FIGS. 2 and 3 effect a serial reading of the fluid velocity at the various points of the pipe, whereas the apparatus of FIG. 4 effects a parallel reading of this velocity.

The apparatus of FIG. 4 can be modified by replacing the optical fibres 76 and 77 with a single optical fibre and the probe S with an optical collimation and collection element, and feeding the backscattered measurement light beam from the directional coupler 72 to the optical collimation element 78, as in the case of the apparatus of FIG. 3.

The apparatus of FIGS. 2, 3 and 4 can use components which, either alone or in combination, perform functions equivalent to those illustrated.

The movable mirror, the movable right prism and the multiple mirror can be replaced by one or more optical components, forming part of the interferometer, and able to vary the optical path of the reference light beam. The mirror and the prism can be replaced by any other reflecting element. The multiple mirror can be replaced by any optical component comprising a plurality of reflecting elements.

Any other low-coherence laser source can be used in place of the superluminescent laser source.

The photodetectors can be replaced by photoelectric transducers of any type, such as photomultipliers.

Figure 6:
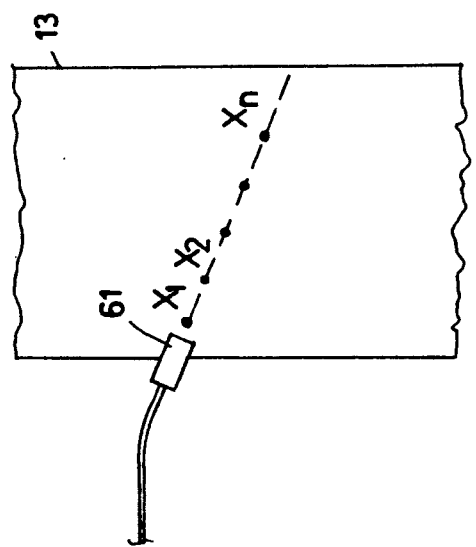
FIGS. 5 and 6 show variations on the position of a component of said apparatus.
Figure 5:
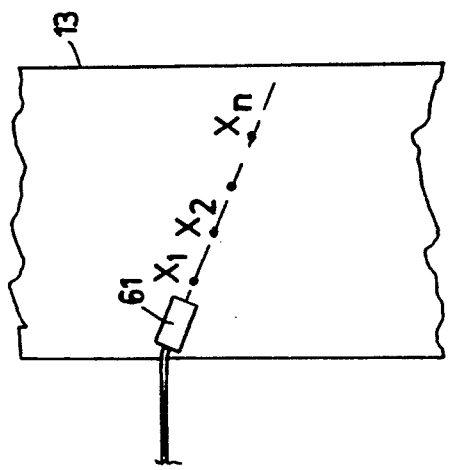

A simple transparent element such as a glass plate can be used in place of the deflection prism 14, in which case the probe or the optical collimation and collection element must be inclined to the direction of fluid flow in the pipe, for the aforesaid reasons. The probe could also be inserted directly into the wall of the pipe 13, as shown in FIG. 5, or into the pipe itself as shown in FIG. 6, by obvious support and fixing means, so avoiding the use of a window. In FIGS. 5 and 6 the probe is shown by way of example as the optical collimation and collection element 61. In the apparatus of FIGS. 2, 3 and 4, instead of differential measurement, simple measurement of a single interference signal can be used as in the scheme of FIG. 1, by employing a single photoelectric transducer in the apparatus of FIGS. 2 and 3, and a single series of photoelectric transducers in the apparatus of FIG. 4.

If it is desired to measure the fluid velocity at only one point of the pipe, a simplified version of the apparatus can be provided in which the optical path of the reference light beam is fixed, for example by using a fixed simple mirror or a fixed right prism. The fluid can be a liquid or an aeriform.

With the described measurement system the velocity of a fluid moving within any delimited or non-delimited space can be measured by simply projecting the measurement light signal into the fluid and collecting that component thereof backscattered by the particles within the fluid.

We claim:

1. A laser apparatus for measuring the velocity of a fluid, in which a measurement laser light beam fed into the fluid and scattered by a particle within the fluid is made to interfere with a reference laser light beam to generate an interference signal based on the velocity of the particle, characterized by comprising a low-coherence laser source and interferometric means which split the light beam of said laser source into said reference light beam and said measurement light beam, and cause the reference light beam derived from the laser source to interfere with the backscattered component resulting from the scattering of the measurement light beam;

wherein the interferometric means comprise an optical component able to vary the optical path of the reference light beam, to measure the velocity of a plurality of particles encountered within the fluid by the measurement light beam at a series of measurement points;

wherein said optical component consist of a movable reflecting element;

wherein the interferometric means comprise a first directional coupler which splits the light beam emitted by the source into said reference light beam and said measurement light beam, the reference light beam being fed to said reflecting element, the measurement light beam being fed to a probe which projects it into the fluid and collects said backscattered component, the reference light beam reflected by the reflecting element and the backscattered component being fed to a second directional coupler to generate the interference signal, the connection between the laser source, the first and second directional coupler and the probe being via optical fibers;

wherein the probe comprises a beam splitter which feeds the measurement light beam into the fluid and collects said backscattered component, feeding it to a deflection prism which directs it to the second directional coupler.

2. A laser apparatus for measuring the velocity of a fluid, in which a measurement laser light beam fed into the fluid and scattered by a particle within the fluid is made to interfere with a reference laser light beam to generate an interference signal based on the velocity of the particle, characterized by comprising a low-coherence laser source and interferometric means which split the light beam of said laser source into said reference light beam and said measurement light beam, and cause the reference light beam derived from the laser source to interfere with the backscattered component resulting from the scattering of the measurement light beam;

wherein the interferometric means comprise an optical component able to vary the optical path of the reference light beam, to measure the velocity of a plurality of particles encountered within the fluid by the measurement light beam at a series of measurement points;

wherein said optical component consist of a movable reflecting element;

wherein the interferometric means comprise a first directional coupler which splits the light beam emitted by the source into said reference light beam and said measurement light beam, the reference light beam being fed to said reflecting element, the measurement light beam being fed to a probe which projects it into the fluid and collects said backscattered component, the reference light beam reflected by the reflecting element and the backscattered component being fed to a second directional coupler to generate the interference signal, the connection between the laser source, the first and second directional coupler and the probe being via optical fibers;

wherein the probe comprises a collimation and collection element which feeds the measurement light beam into the fluid and collects said backscattered component and directs it to said first directional coupler which directs it to the second directional coupler, the connection between the first directional coupler and the collimation and collection element being via a single optical fiber.

3. A laser apparatus for measuring the velocity of a fluid, in which a measurement laser light beam fed into the fluid and scattered by a particle within the fluid is made to interfere with a reference laser light beam to generate an interference signal based on the velocity of the particle, characterized by comprising a low-coherence laser source and interferometric means which split the light beam of said laser source into said reference light beam and said measurement light beam, and cause the reference light beam derived from the laser source to interfere with the backscattered component resulting from the scattering of the measurement light beam;

wherein the interferometric means comprise an optical component able to vary the optical path of the reference light beam, to measure the velocity of a plurality of particles encountered within the fluid by the measurement light beam at a series of measurement points;

wherein said optical component consist of a movable reflecting element;

wherein the interferometric means comprise a first directional coupler which splits the light beam emitted by the source into said reference light beam and said measurement light beam, the reference light beam being fed to said reflecting element, the measurement light beam being fed to a probe which projects it into the fluid and collects said backscattered component, the reference light beam reflected by the reflecting element and the backscattered component being fed to a second directional coupler to generate the interference signal, the connection between the laser source, the first and second directional coupler and the probe being via optical fibers;

wherein the reference light beam is fed to the reflecting element via a beam splitter which also feeds the reflected reference light beam to the second directional coupler;

wherein a modulator is interposed between the beam splitter and the reflecting element.

4. A laser apparatus for measuring the velocity of a fluid, in which a measurement laser light beam fed into the fluid and scattered by a particle within the fluid is made to interfere with a reference laser light beam to generate an interference signal based on the velocity of the particle, characterized by comprising a low-coherence laser source and interferometric means which split the light beam of said laser source into said reference light beam and said measurement light beam, and cause the reference light beam derived from the laser source to interfere with the backscattered component resulting from the scattering of the measurement light beam;

wherein the interferometric means comprise an optical component able to vary the optical path of the reference light beam, to measure the velocity of a plurality of particles encountered within the fluid by the measurement light beam at a series of measurement points;

wherein said optical component consist of a movable reflecting element;

wherein the interferometric means comprise a first directional coupler which splits the light beam emitted by the source into said reference light beam and said measurement light beam, the reference light beam being fed to said reflecting element, the measurement light beam being fed to a probe which projects it into the fluid and collects said backscattered component, the reference light beam reflected by the reflecting element and the backscattered component being fed to a second directional coupler to generate the interference signal, the connection between the laser source, the first and second directional coupler and the probe being via optical fibers;

wherein the movable reflecting element is a right prism which deviates the reference light beam from the first directional coupler towards the second directional coupler;

wherein a modulator is interposed between the right prism and the second directional coupler.

5. A laser apparatus for measuring the velocity of a fluid, in which a measurement laser light beam fed into the fluid and scattered by a particle within the fluid is made to interfere with a reference laser light beam to generate an interference signal based on the velocity of the particle, characterized by comprising a low-coherence laser source and interferometric means which split the light beam of said laser source into said reference light beam and said measurement light beam, and cause the reference light beam derived from the laser source to interfere with the backscattered component resulting from the scattering of the measurement light beam;

wherein the interference light signal is decomposed into two identical interference signals out of phase by 180° to effect a differential measurement of the interference.

6. A laser apparatus for measuring the velocity of a fluid, comprising a laser source for generating a laser light beam having a low-coherence length, interferometric means including splitting means, reflecting means and photodetection means, wherein said laser light beam is split by said splitting means into a reference light beam and a measurement light beam following different optical paths and said reference light beam is sent to said reflecting means and is reflected and sent to said photodetection means, and wherein said measurement light beam is fed substantially unfocused into the fluid and is backscattered by particles within the fluid to form a backscattered light beam returning to said interferometric means, said reflected reference light beam and said backscattered light beam being caused to interfere at said photodetection means to generate an interference signal depending on the velocity of said particles, said reflecting means, said splitting means and said photodetection means being positioned relative to each other such that the optical path of said backscattered light beam and the optical path of said reflected reference light beam differ by an amount which is within said low-coherence length of said low-coherence length laser source.

7. A laser apparatus as claimed in claim 6, wherein said reflecting means is movable to vary said optical path of said reference light beam and to measure the velocity of a plurality of particles encountered within the fluid by said measurement light beam at a plurality of measurement points along the substantially unfocused measurement light beam.

8. A laser apparatus as claimed in claim 6, wherein said reflecting means comprise a plurality of reflecting elements arranged adjacent to each other and differently spaced from said splitting means, whereby each of said reflecting elements defines an optical path for said reference light beam which is different from the optical path defined by any other of said reflecting elements.

9. A laser apparatus as claimed in claim 7, wherein the interferometric means comprise a first directional coupler which splits the light beam emitted by the source into said reference light beam and said measurement light beam, the reference light beam being fed to said reflecting element, the measurement light beam being fed to a probe which projects it into the fluid and collects said backscattered component, the reference light beam reflected by the reflecting element and the backscattered component being fed to a second directional coupler to generate the interference signal, the connection between the laser source, the first and second directional coupler and the probe being via optical fibres.

10. A laser apparatus as claimed in claim 9, wherein the reference light beam is fed to the reflecting element via a beam splitter which also feeds the reflected reference light beam to the second directional coupler.

11. A laser apparatus as claimed in claim 10, wherein the movable reflecting element is a mirror.

12. A laser apparatus as claimed in claim 9, wherein the movable reflecting element is a right prism which deviates the referenced light beam from the first directional coupler towards the second directional coupler.

13. A laser apparatus as claimed in claim 8, wherein the interferometric means comprise a directional coupler which splits the light beam emitted by the laser source into said reference light beam and said measurement light beam, the reference light beam being fed to a first optical element which produces at its exit a wide light beam directed to a first beam splitter which feeds it to said plurality of reflecting elements, the measurement light beam being fed to a probe which projects it into the fluid and collects said backscattered component, feeding it to a second optical element which produces at its exit a wide light beam and directs it to a second beam splitter, the first beam splitter feeding the wide reference light beam reflected by the reflecting elements to the second beam splitter to generated a plurality of interference signals.

14. A laser apparatus as claimed in claim 13, wherein the probe comprises a beam splitter which feeds the measurement light beam into the fluid and collects said backscattered component, feeding it to a deflection prism which directs it to said second optical element.

15. A laser apparatus as claimed in claim 13, wherein the probe comprises a collimation and collection element which feeds the measurement light beam into the fluid and collects said backscattered component, feeding it to the directional coupler which directs it to said second optical element, the connection between the directional coupler and the collimation and collection element being via a single optical fibre.

16. A laser apparatus as claimed in claim 13, wherein said plurality of reflecting elements form part of a multiple mirror.

17. A laser apparatus as claimed in one of claims 6 and 7 wherein the interference light signal is detected by photoelectric transducers connected to an electronic processor unit.

18. A laser apparatus as claimed in claim 7, wherein the reflecting element is connected to a translator moved by a motor, the interference signal being detected by photoelectric transducers, an electronic processor unit being provided connected to the motor and transducers, to determine from the interference signal and the position of the reflecting element the velocity of each particle encountered within the fluid by the measurement light beam.

19. A laser apparatus as claimed in claim 6, for measuring the velocity of the fluid within a pipe, wherein the measurement laser beam is fed into the pipe via a window consisting of a deflection prism.

20. A laser apparatus as claimed in claim 9 or 13, for measuring the velocity of the fluid within a pipe, wherein said probe is inserted into the pipe wall.

21. A laser apparatus as claimed in claim 9 or 13, for measuring the velocity of the fluid within a pipe, wherein said probe is inserted into the pipe.

22. A laser apparatus for measuring the velocity of a fluid, in which a measurement laser light beam fed into the fluid and scattered by a particle within the fluid is made to interfere with a reference laser light beam to generate an interference signal based on the velocity of the particle, characterized by comprising a low-coherence laser source and interferometric means which split the light beam of said laser source into said reference light beam and said measurement light beam, and cause the reference light beam derived from the laser source to interfere with the backscattered component resulting from the scattering of the measurement light beam;

wherein the interference light signal is decomposed into two identical interference signals out of phase by 180° to effect a differential measurement of the interference;

wherein the interference light signal is detected by photoelectric transducers connected to an electronic processor unit.

* * * * *